United States Patent [19]
Reilly

[11] 3,880,301
[45] Apr. 29, 1975

[54] APPARATUS FOR HANDLING WORKPIECES

[75] Inventor: Joseph R. Reilly, Naugatuck, Conn.

[73] Assignee: Monsanto Company, St. Louis, Mo.

[22] Filed: Dec. 14, 1973

[21] Appl. No.: 424,866

[52] U.S. Cl. .................. 214/21; 198/26; 198/131; 198/155
[51] Int. Cl. ............................................ B65g 47/38
[58] Field of Search ........ 214/18 R, 21; 198/20, 26, 198/131, 155, 177, 181

[56] References Cited
UNITED STATES PATENTS

| | | | |
|---|---|---|---|
| 1,718,607 | 6/1929 | Soubier | 198/26 X |
| 2,292,220 | 8/1942 | Gardner | 198/131 |
| 2,599,721 | 6/1952 | Remington et al. | 198/131 X |
| 3,032,172 | 5/1962 | Jensen | 198/177 |

*Primary Examiner*—Robert G. Sheridan
*Attorney, Agent, or Firm*—Michael J. Murphy

[57] ABSTRACT

A process for handling workpieces by sequentially loading them into holder portions of continuously moving carrier assemblies, simultaneously abruptly shifting a group of such holders to workpiece-release positions at a discharge station while continuing movement of the carrier assemblies back toward the loading stations, and resetting the holders prior to arrival at the loading station in order to receive additional workpieces. The apparatus includes a holder trip mechanism portion of each carrier assembly, means supporting such assemblies for sequential movement along an endless path, an actuating assembly for simultaneously triggering the trip mechanisms of a group of the carrier assemblies at the discharge station and reset means for returning the holders to workpiece-engaging positions. The process and apparatus is especially adapted for use in combination with a system for temperature-conditioning elongated molded parts.

8 Claims, 6 Drawing Figures

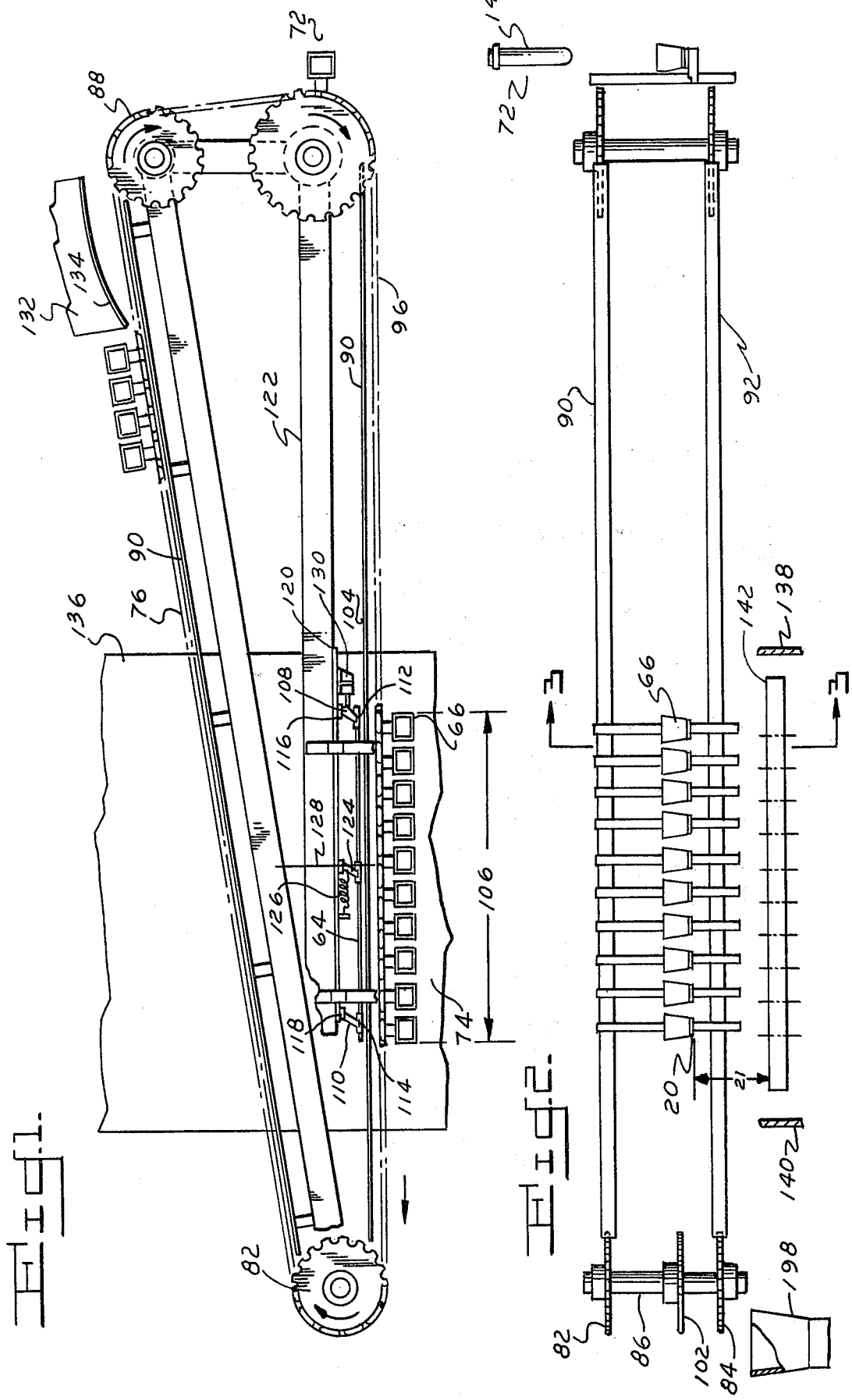

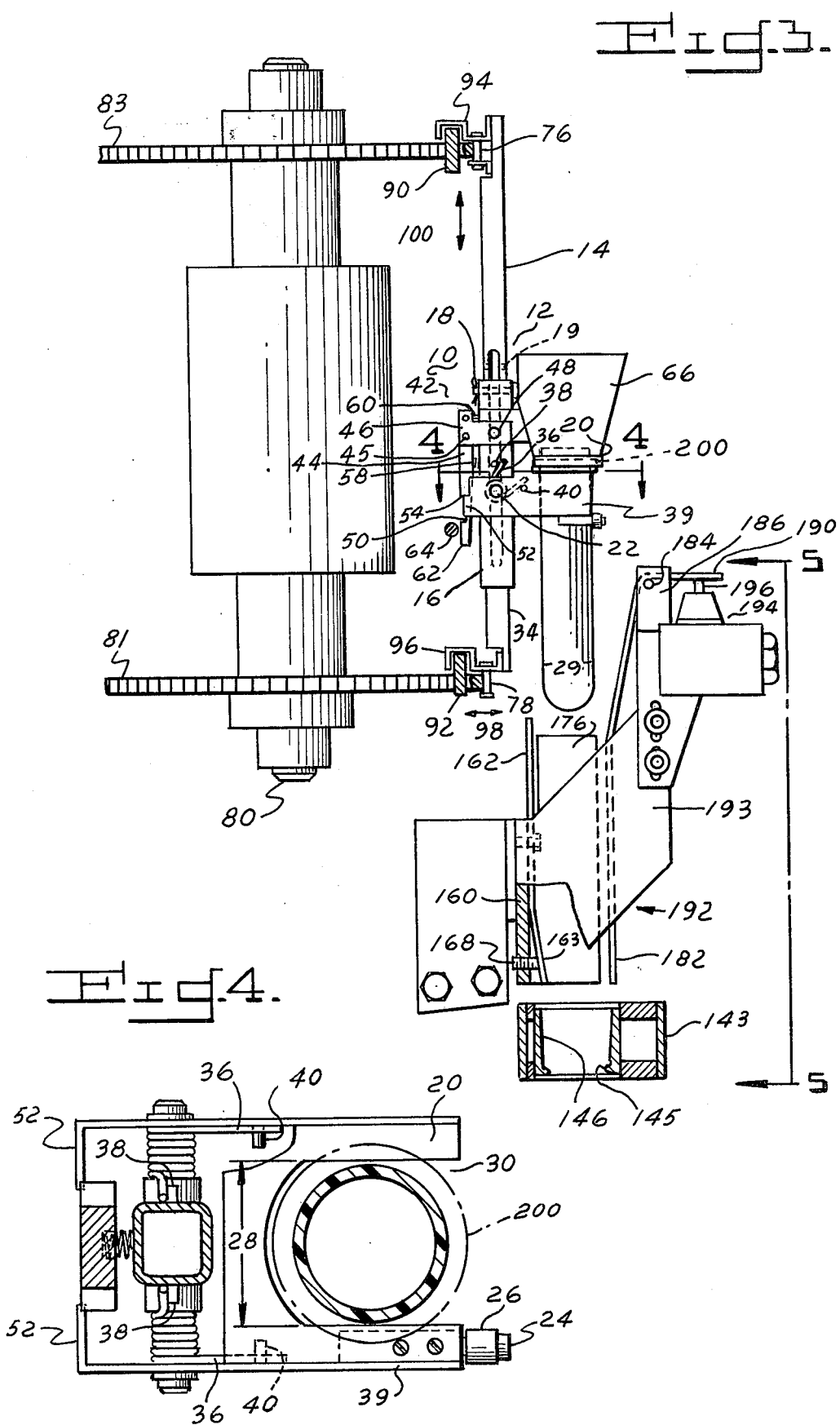

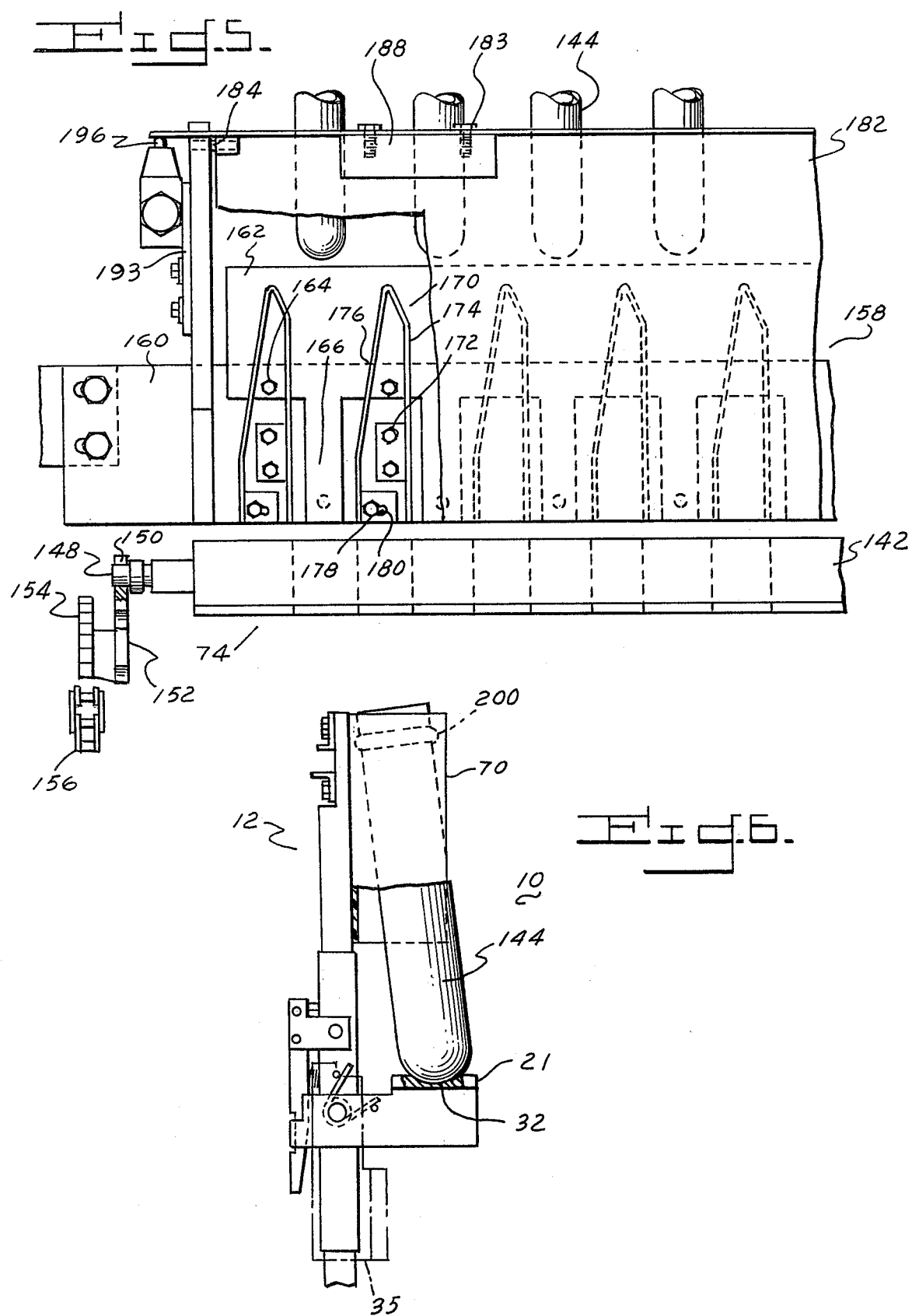

3,880,301

APPARATUS FOR HANDLING WORKPIECES

BACKGROUND OF THE INVENTION

This invention relates to method and apparatus for handling workpieces and more particularly to collecting, conveying and releasing molded parts to a temperature-conditioning chamber.

In copending application Ser. No. 418,075, filed Nov. 21, 1973, assigned to the present assignee, there is disclosed a high speed, high volume system for temperature-conditioning workpieces such as elongated, thermoplastic, molded parts in order to bring them to molecular orientation temperature prior to reshaping into articles such as containers. In such disclosed system, a plurality of parts are supported in parallel in bar assemblies sequentially presented to a loading station and then passed through a chamber containing a suitable heat transfer means. The system has numerous advantages as therein disclosed, a major one being minimum contact of the parts with the components of the apparatus. The need is apparent for a system with a similar scope of advantages, broadly applicable to the handling of workpieces in general, and specifically to elongated molded, thermoplastic parts upstream of a temperature-conditioning station such as that disclosed in the previously mentioned copending application.

SUMMARY OF THE INVENTION

Accordingly, it is a primary object of this invention to provide a facile method and apparatus for handling workpieces, particularly elongated, thermoplastic molded parts which are to be temperature-conditioned in an immediately downstream station.

Another object of this invention is to provide such method and apparatus which is not reliant on substantial contact between hot deformable parts and the handling apparatus or on numerous workpiece position-orienting steps.

A further object of this invention is to provide continuous method of receiving workpieces from an upstream station, conveying them in individual carriers to a discharge area where they are automatically ejected into waiting receptables and then recycling the carriers without stopping to pick up additional workpieces.

A specific object of this invention is to provide an improved carrier assembly for handling parts between adjacent work stations.

Other objects will in part be obvious and will in part appear hereinafter.

These and other objects are accomplished by providing a workpiece carrier assembly comprising post means, a holder pivoted to the post means, a trip mechanism for abruptly shifting the holder to a workpiecerelease position, and means associated with the holder for cooperating with nearby position-changing means for returning the holder to its workpiece-engaging attitude.

A plurality of such assemblies are preferably provided in a continuous with means supporting the assemblies for continuous sequential movement through loading and discharge stations and with an actuating assembly for simultaneously triggering the trip mechanisms of a group of such plurality of carrier assemblies at the discharge station.

The apparatus is especially adapted for use with equipment for temperature-conditioning the workpieces or parts which includes a horizontally extending heat transfer chamber, support means for carrrying a plurality of parts in side-by-side relationship through the chamber and means for releasably detaining the support means at a feed end of the workpiece-release while the parts are deposited in the support means on being ejected from the carrier assemblies under the influence of the actuating assembly.

The process comprises sequentially loading workpieces into holders of individual carrier assemblies, continuously moving the loaded assemblies along a path toward a discharge station, simultaneously abruptly shifting a plurality of such holders at the discharge station to release positions to discharge the workpieces without stopping movement of the carrier assemblies and then resetting the holders before ariving back at the loading station to receive additional parts.

BRIEF DESCRIPTION OF THE DRAWINGS

In describing the overall invention, reference will be made to the accompanying drawings wherein:

FIG. 1 is a plan view of apparatus embodying the present invention;

FIG. 2 is an elevational view of the apparatus of FIG. 1;

FIG. 3 is a sectional view in detail along 3—3 of FIG. 2;

FIG. 4 is a sectional view along 4—4 of FIG. 3;

FIG. 5 is a schematic, partially sectioned view in the direction of 5—5 of FIG. 3; and FIG. 6 is an elevational view of an alternative embodiment of the carrier assembly portion of the invention.

DETAILED DESCRIPTION OF ILLUSTRATED EMBODIMENTS

Referring now to the drawings, there is shown in FIGS. 3 and 6 a workpiece carrier assembly generally indicated as 10 comprising upright port means 12 which includes hollow post 14 telescopically received in sleeve 16 and secured thereto by cotter pin 18. Post 14 may have a series of vertically spaced, horizontally aligned holes 19 which may be positioned adjacent similar holes in sleeve 16 for insertion of pin 18 in order to adjustably position sleeve 16 and consequently the parts carried by it with respect to post 14. In this manner the extent of free fall of a workpiece during either feed to or discharge from (e.g. 21 in FIG. 2) the holder portion of a carrier assembly can be regulated.

Holder portion 20 (FIG. 4) is pivoted at 22 (FIG. 3) to post 14 and sleeve 16 and has means including roller 24 journaled for rotation via bearing 26 projecting outwardly therefrom for cooperating with nearby position-changing means (132 in FIG. 1) for returning holder 20 to the workpiece-engaging attitude of FIG. 3. In FIGS. 1–4 the holder portion is in the form of U-shaped clip 20 opening outwardly at 30 with the distance 28 (FIG. 4) between opposing legs of the clip being greater than diameter 29 of part 144 (FIG. 3) but less than that of enlargement 200 thereof so that the latter rests on clip 20 when part 144 is carried by assembly 10. In the embodiment of FIG. 6, holder portion 21 is a solid platform, which may be of resilient material, having depression 32 in which a spherical end of the workpiece is seated. In the embodiment of FIG. 6, vertical cradle portion 70 secured to post 14 above platform 21 surrounds the upper portion of part 144 and serves to prevent it from toppling off during movement of the carrier assembly.

Each assembly 10 further includes means such as a pressure actuated trip mechanism for abruptly shifting clip 20 (or platform 21) downwardly from a locked position toward and against lower end 34 of post 14 to the release position shown at 35 in outline form in FIG. 6. Such trip mechanism comprises a pair of torsion springs 36 on either side of clip 20 wedged between pins 38 and 40 on sleeve 16 and holder arm portions 39 for biasing holder 20 downwardly toward post end 34. Latch means generally indicated as 42 associated with holder arm portions 39 and post means 12 secure holder 20 in the workpiece-engaging position of FIG. 3 and includes latch 44 secured at its inner end at 45 on either side to extensions 46 which in turn are pivoted to post means 12 via pin 48 extending through both sleeve 16 and hollow post 14 above holder 20. Slot or cutout 50 at the opposite free end of latch 44 receives end portions 52 of holder arm portions 39 which, via abutment against ledge 54, resist downward urging of springs 36 to thereby fix clip 20 in a horizontal, locked, operative position perpendicular to the vertical axis of post 14. Compression spring 58 beneath pivot connection 48 urges latch 44 outwardly away from post 14. Set screw 60 threadably secured in latch 44 projects toward post 14 above pivot 48 and adjustably limits the extent of outward bias of latch 44 by spring 58 away from post 14 via abutment with the latter. By advancing screw 60 toward or away from post 14 the position of free end 62 of latch 44 may be set with respect to horizontal bar 64. In lieu of cradle 70 (FIG. 6) funnel member 66 can be used to guide a workpiece into holder 20 and may be mounted above holder 20 and secured to adjustably positioned sleeve 16 also via cotter pin 18. The narrow outlet end of funnel 66 is aligned above the opening of clip or holder portion 20.

A plurality of adjacent carrier assemblies 10 are provided as schematically indicated in FIGS. 1 and 2 and preferably occupy the full periphery of the apparatus, i.e. along the three sides of the triangular layout of FIG. 1, though not so indicated therein for purposes of simplicity.

Means supporting each carrier assembly 10 for continuous, sequential movement through a loading station generally indicated at 72 in FIG. 2 and a discharge station generally indicated at 74 in FIG. 1, includes vertically spaced upper 76 and lower 78 (FIG. 3) chains mounted for movement along an endless path via a suitable means such as a conventional motor, not shown, attached to shaft 80 (FIG. 3). Coaxial sprockets 82 and 84 (FIG. 2) are conventionally secured to bearing-mounted rotatable shaft 86 between loading and discharge stations 72 and 74 with similar sprockets 81 and 83 provided at loading station 74 and intermediate area 88 (FIG. 1). Upper 90 and lower 92 guide bars (FIG. 3) adjacent chains 76 and 78 extend along the entire lengths thereof. Upper and lower clips 94 and 96 (FIG. 3) slidably straddle bars 90 and 92 and are secured via screws to the upper and lower ends of a post 14 of a carrier assembly and to chains 90 and 92 at equally spaced intervals, and serve to stabilize each carrier assembly 10 in the horizontal 98 (FIG. 3) and vertical 100 directions during movement with such chains.

Latch deflecting projecting means, such as vertically adjustable disc 102 on shaft 86 (FIG. 2) having an outer edge lying in the path of the latch 44 of each carrier assembly, may be provided to trigger each trip mechanism when a holder 20 is supporting a workpiece as it passes disc 102.

Actuating or trigger mechanism 104 (FIG. 1) at discharge station 74 is provided for simultaneously triggering the trip mechanisms of a group, such as the ten shown at 106 in FIG. 2, of the plurality of carrier assemblies 10. Assembly 104, comprises horizontal bar 64 having a length at least equal to the portion of the path occupied by the holder portions of the series of adjacent assemblies to be simultaneously actuated during a cycle of the apparatus. In the illustrated embodiment, such length is substantially equivalent to distance 106 in FIG. 1. Trigger assembly 104 includes means for cyclically pivoting bar 64 into and out of contact with end portions 62 of the latch members (FIG. 3) to actuate the trip mechanisms thereof to abruptly shift holders 20 to their workpiece-release positions. Such means in the illustrated embodiment comprise (FIG. 2) first 108 and second 110 link members horizontally spaced from each other and pivoted at 112 and 114 respectively to bar 64 and at 116 and 118 to rigid support plate 120 mounted on a suitable frame 122. Intermediate link 124 is similarly pivotably secured at both its ends to bar 64 and support 120 respectively. Tension spring 126 secured to link 124 and anchored to support plate 120 urges bar 64 toward the at-rest position of FIG. 1, i.e. away from the alternative, operative bar-engaging position in which link 124 is parallel with plane 128. Normally open solenoid valve 130 pivotally secured to link member 108 urges bar 64 via the just-described link connections toward such alternative operative position when energized.

Trip mechanism reset means for returning each holder portion 20 to the position of FIG. 3 are provided between discharge and loading stations 72 and 74 and includes lifting structure such as cam 132 having upwardly inclined edge 134 automatically engageable by roller 24 of each holder portion 20 as its carrier assembly moves through this area during its path of travel. Edge 134 cooperating with roller 24 thus mechanically urges each holder 20 upwardly against the bias of springs 36 until holder arm portions 39 snap into cutout 50 of latch 44 against ledge 54.

Though broadly operable in any environment, the system just described is particularly adapted for use with temperature-conditioning equipment which may, for example, comprise a horizontally extending heat transfer chamber schematically illustrated at 136 in FIG. 1 having vertical sides 138 and 140, FIG. 2. As described in copending application Ser. No. 418,075, filed Nov. 21, 1973, receiving or support means 142 (FIGS. 2, 3 and 5) may be provided for carrying a plurality of molded parts, such as preforms 144, in side-by-side parallel relationship through chamber 136. Support means 142 includes a suitable housing 143 containing a plurality of sockets 146 linearly arranged across the width of chamber 136 beneath the holder portions 20 of a group of carrier assemblies 10 in discharge station 74 in the manner most clearly shown in FIG. 3. The centerline distance between immediately adjacent sockets is preferably equal to that between immediately adjacent holders 20.

As illustrated in FIG. 5, means are provided as part of the temperature-conditioning equipment to releasably detain each support means 142 at the feed end of conditioner 136, which in the illustrated embodiment is considered to be carrier assembly discharge station 74 whereat preforms 144 are deposited in sockets 146. Such releasable detaining means includes, as further described in said copending application, protruding boss 148 at the end of support means housing 143, seated in an open ended slot 150 of escapement wheel 152 which is integral with sprocket 154, the latter meshing with chain 156 which in turn is driven by power generated from a suitable conventional cyclically electrically energized intermitter (not shown) for intermittently turning each wheel 152 a predetermined angular amount. A similar set of parts as just described, though not shown, is located at the opposite end of support means 142 on the right side in FIG. 5. Thus, receiving or support means 142 when such intermitter is in deenergized condition temporarily dwells in station 74 while preforms 144 are deposited in sockets 146, whereupon the intermitter is energized to rotate wheels 152 to release bosses 148 from confinement in slots 150 and thus allow support means 142 to advance through chamber 136 via a suitable conveying means, not shown, such as coacting chain and sprocket members.

Adjustable chute assembly 158 (FIG. 5) may be between sockets 146 and the particular group of holder portions 20 which are to be actuated in discharge station 74, and serves to guide workpieces 144 released from holders 20 into the pockets of sockets 146. Chute assembly 158 includes rigid backing plate 160 extending across the width of and above chamber 136 to which rear guide 162 is secured by suitable means such as screws 164. Rear guide 162 has extensions 166 in line behind the pockets formed by sockets 146 with lower end portions 163 (FIG. 3) being adjustable toward and away from such sockets via studs 168 threaded in backing plate 160. Adjacent fingers 170 in front of rear guide 162 secured at 172 to backing plate 160 form guide walls on either lateral side of a socket 146, in the form of a vertical portion 174 on one side of a socket and portion 176 on the other side inclined toward the socket axis, each latter portion 176 also being adjustable crosswise of chamber 136 via set screws 178 in elongated slots 180. Front guide plate 182 (FIG. 3) of chute assembly 158 extends down in front of the sockets generally parallel to rear guide 162 and is pivoted at 184 to stanchion 186, the latter in turn being connected via a suitable bracket 193 to backing plate 160. A plurality of weights 188 bolted at 183 to the underside of horizontal overhung portion 190 of front guide plate 182 (FIG. 5) at intervals across the width thereof urge plate 182 to the rear about pivot 184 in the direction of arrow 192 in FIG. 3.

Condition-responsive-means such as microswitch 194 may be adjustably mounted on bracket 193 adjacent the end of overhung portion 190 of plate 182, as illustrated in FIG. 3, and includes force-detecting probe 196 in normal contact with the underside of horizontal portion 190. Microswitch 194, via suitable conventional electrical wiring is operatively connected into the circuits for actuating solenoid valve 130 of trigger assembly 104 and the intermitter for presenting a support assembly 142 at discharge station 74.

Collection means including chute 198 (FIG. 2) beneath disc 102 discharging to a suitable parts-recovery means, not shown, is provided downstream of discharge station 74 for accepting parts released from holders 20 as a result of interfering cooperation between the periphery of disc 102 and the trip mechanisms of the various carrier assemblies.

In operation, according to the illustrated embodiment, a continuing succession of elongated, hollow molded workpieces or parts 144 having enlarged portions 200 adjacent one open end are sequentially loaded in series, as schematically illustrated in FIG. 2, either manually or by suitable automatic means, into holders or clips 20 of individual carrier assemblies 10 via funnels 66 from an upstream area such as a molding or trimming station 72. As shown in FIG. 3, the only portion of part 144 in contact with any of the components of the apparatus of the invention at any time need only be the relatively limited supported area on the underside of enlargement 200 resting on the upper surface of clip 20. This is especially important when, for various reasons, minimum contact of the part with the handling apparatus is desirable. As stated, assemblies 10 occupy the full length of chains 76 and 78 which continuously move loaded assemblies 10 in sequence from loading station 72 toward discharge station 74. At precisely timed periodic intervals established by conventionally synchronizing the actuation of solenoid valve 130 and the previously mentioned intermitter for moving sockets 146 into station 74, bar 64 is tripped, i.e. moved to the right from its FIG. 3 position, to simultaneously abruptly release the ends 52 of arm portions 39 from engagement with ledge 54 of each of those assemblies which happen at that time to be adjacent bar 64, thus pivoting holders 20 under the influence of springs 36 downwardly to their release positions. In so doing, each part 144 is ejected through open side 30 of a U-shaped holder while movement of its carrier assembly continues through station 74, whereupon the part then falls under its own weight into the pockets formed by sockets 146, or like equipment, waiting below. The release action is similar with the embodiment of FIG. 6 in that platform 21 is abruptly pivoted down from beneath the lower end of a part 144 on actuation of the trigger assembly. The continuously moving unloaded carrier assemblies are thereupon conveyed back toward loading station 74 to pick up additional workpieces. Along the way, follower 24 of each assembly rides upwardly along edge 134 of cam 132 so as to raise or reset each holder 20 before arriving back at loading station 72.

As can be appreciated, the discharged parts 144 between the holders and sockets will follow a parabolic trajectory as a result of the continuing movement of the carrier assemblies during discharge. This trajectory will vary depending a.) on the velocity of chains 76, 78, which can, for example, reach 75 feet per minute or more, and b.) the weight of the parts 144 which may vary in size and shape. The released parts following such a variable trajectory can be guided into the pockets of the temporarily restrained sockets by suitably adjusting the various portions of chute assembly 158 when the latter is used.

After a support assembly 142 (FIG. 5) has been partially or completely loaded with a plurality of workpieces 144 via engagement of enlargements 200 with a step 145 in the base of each socket as generally indicated in FIG. 3, it is released from the station 74 so as to advance through chamber 136 via engagement with suitable driven chains, not shown, but more particularly described and illustrated in the previously mentioned copending application.

In the event a part 144 does not truly seat in the pocket of a socket assembly 146 but rather instead becomes wedged or trapped, for example between adjacent finger guides 170, such malfunction will be sensed when support assembly 142 advances away from station 74 in that front guide plate 182 will pivot forwardly under the influence of the wedged part in opposition to the rearward bias generated by weights 188. When this occurs, probe 196 of switch 194 breaks contact with plate portion 190 and creates an electrical signal rendering solenoid 130 inoperative and temporarily deenergizing the intermitter supplying support assemblies 142 to station 74. Under such condition, successive carrier assemblies 10, which continue to move with chains 76 and 78 around the closed path, approach disc 102 in loaded condition which, as previously described, causes release of consecutive parts 144 to chute 198 as a result of interfering contact between the periphery of disc 102 and latch 44. This continues until the temporary system blockage is corrected by removing the wedged part, which automatically brings weighted plate portion 190 back into contact with probe 196, which condition removes the overriding electrical signal(s) rendering solenoid 130 and the intermitter inoperative, whereupon these latter members again commence to function in normal manner.

Various modifications and alterations of the invention will be readily suggested to persons skilled in the art. It is intended therefore, that the foregoing be considered as exemplary only and that the scope of the invention be ascertained from the following claims.

What is claimed is:

1. Workpiece handling apparatus comprising:
A. a plurality of upright carrier assemblies, each including a post means and a holder portion for supporting a workpiece associated with said post means;
B. means for abruptly shifting each holder portion with respect to the post means to a workpiece-release position and for returning each holder portion to a workpiece-engaging position;
C. a bar assembly for simultaneously actuating the means for abruptly shifting a group of holder portions of the plurality of carrier assemblies to workpiece-release positions at a discharge station;
D. means supporting said plurality of carrier assemblies for continuous sequential movement along a path through a loading and said discharge stations;
E. a socket beneath each holder of said group for accepting a released workpiece; and
F. an adjustable chute assembly for guiding released workpieces into the sockets.

2. The apparatus of claim 1 wherein said chute assembly includes adjustably positioned upstanding guides between the sockets and said group of holder portions defining a four-sided chute above each socket.

3. The apparatus of claim 2 wherein the adjustable guide forming the front side of the chute is pivoted to a rigid support and biased toward the rear of said four-sided chute.

4. The apparatus of claim 3 including switch means in operative association with said front guide and said bar assembly.

5. Workpiece handling apparatus comprising:
A. a plurality of carrier assemblies, each including:
 a. post means;
 b. a holder associated with the post means for supporting a workpiece; and
 c. a trip mechanism for abruptly shifting said holder to a workpiece-release position;
B. means supporting said carrier assemblies for continuous sequential movement along a path through loading and discharge stations comprising:
 a. vertically spaced chains mounted for continuous movement through an endless path;
 b. guide bars adjacent each chain;
 c. clips for each carrier assembly slidably straddling a guide bar and secured to the post means and chains at spaced intervals for stabilizing each carrier assembly during movement with such chains;
 d. coaxial sprockets for said chains secured to a rotatably mounted shaft downstream of said discharge station; and
 e. a disc on said shaft between said sprockets adapted to trigger said trip mechanism when a holder is in a workpiece-engaging position as it passes said disc;
C. a trigger assembly at the discharge station for simultaneously coacting with the holder portions of a series of adjacent carrier assemblies comprising:
 a. a bar in a substantially horizontal position having a length at least equal to the portion of the path occupied by said series of adjacent carrier assemblies; and
 b. means for cyclically pivoting said bar to actuate the trip mechanisms of said series of adjacent carrier assemblies to workpiece-release positions;
D. trip mechanism reset means between the discharge and loading stations for returning the trip mechanisms to workpiece-engaging positions;
E. a plurality of stationary socket members beneath said group of holder portions for accepting released workpieces; and
F. an adjustable chute assembly for guiding the released workpieces into the socket members, said chute assembly including:
 a. adjustably positioned upright guide members between the socket members and said group of holder portions defining a four-sided chute above each socket member; and
 b. switch means in operative association with one of said adjustably positioned upright members and said means for cyclically pivoting the bar.

6. In temperature-conditioning means comprising:
A. a horizontally extending heat transfer chamber;
B. support means for carrying a plurality of molded parts in side-by-side relationship during passage through said chamber; and
C. means for releasably detaining said support means at a parts loading station at one end of said chamber while said parts are deposited in said support means;

the combination therewith of:
D. a plurality of carrier assemblies, each including:
 a. a holder for supporting one of said molded parts; and
 b. a trip mechanism for abruptly shifting said holder to a part-release position;
E. means supporting said carrier assemblies for continuous sequential movement along an endless path, part of which lies above said parts loading station;

F. an actuating assembly for simultaneously triggering the trip mechanisms of a group of said plurality of carrier assemblies substantially corresponding to the number of places in said support means as said group of carrier assemblies pass above the loading station; and G. trip mechanism reset means downstream of said parts loading station for returning the trip mechanisms to part-engaging positions.

7. The combination of claim 6 including:

i. projecting means in the path of the trip mechanisms of the plurality of carrier assemblies to trip any trip mechanisms not triggered by the actuating assembly;

ii. collection means beneath said projecting means to accept parts released from holders as a result of cooperation between the projecting means and trip mechanisms;

iii. a chute assembly between the actuating assembly and the support means for guiding released parts into the support means, said chute assembly having a pivotally mounted side biased in a direction opposite to that of the parts passing through the chamber; and iv. switch means operatively associated with a.) the pivotally mounted side, b.) the actuating assembly and c.) the means for releasably detaining the support means at the parts loading station.

8. Workpiece handling apparatus comprising:

A. a plurality of upright carrier assemblies, each including a post means and a holder portion associated with said post means for supporting a workpiece;

B. means for abruptly shifting each holder portion with respect to the post means to a workpiece-release position and for returning each holder portion to a workpiece-engaging position;

C. means supporting said carrier assemblies for continuous sequential movement along a path through loading and discharge stations;

D. a trigger assembly at the discharge station for simultaneously coacting with portions of a series of adjacent carrier assemblies comprising:

a. a bar in a substantially horizontal position having a length at least equal to the portion of the path occupied by said series of adjacent assemblies; and b. means for cyclically moving said bar to actuate the means for abruptly shifting the holder portions of said series of adjacent assemblies to workpiece-release positions; and E. socket assemblies beneath the holder portions of said series of adjacent carrier assemblies for accepting released workpieces.

* * * * *